United States Patent [19]
Nakamura

[11] Patent Number: 6,033,513
[45] Date of Patent: Mar. 7, 2000

[54] METHOD OF ADHESIVE APPLICATION USING TRANSFER ROLL

[75] Inventor: Yukio Nakamura, Tokyo, Japan

[73] Assignee: Nordson Corporation, Westlake, Ohio

[21] Appl. No.: 09/118,649

[22] Filed: Jul. 17, 1998

[30] Foreign Application Priority Data

Jul. 25, 1997 [JP] Japan ..................................... 9-215585

[51] Int. Cl.$^7$ .......................... B44C 1/165; B32B 31/00; B05C 11/00; B05C 1/00; B05D 15/10

[52] U.S. Cl. .......................... 156/230; 156/231; 156/277; 156/289; 118/63; 118/211; 118/212; 118/258; 427/207.1; 427/208.2

[58] Field of Search .................................... 156/230, 231, 156/240, 247, 277, 289, 444; 118/258, 261, 262, 240, 211, 212, 62, 63, 410, 411, 245, 221; 427/207.1, 208.2

[56] References Cited

U.S. PATENT DOCUMENTS

| | | | |
|---|---|---|---|
| 2,474,035 | 6/1949 | Crandon | 156/285 |
| 3,377,001 | 4/1968 | Hazard | 118/212 |
| 3,490,414 | 1/1970 | Herman et al. | 118/221 |
| 3,832,213 | 8/1974 | Brenner | 117/44 |
| 3,861,351 | 1/1975 | Bonwit et al. | 118/6 |
| 4,168,830 | 9/1979 | Hori et al. | 271/176 |
| 4,287,846 | 9/1981 | Klein | 118/212 |
| 4,347,095 | 8/1982 | Yamashita | 156/578 |
| 4,538,541 | 9/1985 | Zimmer | 118/258 |
| 4,948,635 | 8/1990 | Iwasaki | 427/345 |
| 5,003,915 | 4/1991 | D'Amato et al. | 118/46 |
| 5,352,322 | 10/1994 | Leverick | 156/578 |

FOREIGN PATENT DOCUMENTS

0839584A2   5/1988   European Pat. Off. .

OTHER PUBLICATIONS

Nordson Corporation, *Photocopier Toner Drum Brush Assembly*, Application Bulletin, Oct. 1988.
Nordson Corporation, *Joint Making in the Perfect Binding Process*, Application Bulletin, Apr. 1991.
Nordson Corporation, *Side Gluing Perfect Bond Books*, Application Bulletin, Dec. 1992.

*Primary Examiner*—Richard Crispino
*Assistant Examiner*—J. A. Lorengo
*Attorney, Agent, or Firm*—Wood, Herron & Evans, L.L.P.

[57] ABSTRACT

A roll transfer coating method for hot melt adhesive comprising a step in which hot melt adhesive supplied from a hot melt adhesive supply apparatus passes through a slotted nozzle with a smoother roll and coats the raised pattern surface of a coating roll upon which a raised pattern is formed; a step in which the item being coated is sandwiched and compressed while being moved between the coating roll and a compression roll and the hot melt adhesive coated on the projections of the coating roll is transferred from the raised surface of the coating roll to the surface of the item being coated, and a step in which hot air for accelerating hot melt adhesive transfer is blown from a direction opposite the roll rotation direction and toward the hot melt adhesive transfer region sandwiched between the coating roll and compression roll.

17 Claims, 2 Drawing Sheets

FIG. I

METHOD OF ADHESIVE APPLICATION USING TRANSFER ROLL

This application is being filed in accordance with 35 U.S.C. § 119 based on Japanese Patent Application No. 09-215585 which is fully incorporated by reference herein.

FIELD OF THE INVENTION

The present invention pertains to a roll transfer coating method for a hot melt adhesive. More specifically, it pertains to a roll transfer coating method for adhesive in which adhesive is first coated on the raised pattern surface of a coating roll upon whose surface a prescribed raised pattern is formed, and this is transferred to and coated on the surface of the item being coated, which is moving flexible paper or plastic film, etc., in contact with the coating roll.

BACKGROUND OF THE INVENTION

A conventional method of roll transfer coating adhesive with some sort of pattern onto a moving strip-shaped item being coated is that of Japanese Application 9-90798, owned by the assignee of the present invention. This conventional method, as shown in FIG. 2, discloses an adhesive coating method comprising a step in which adhesive is packed by doctor blade 54 into depressions in first roll 53, which has a surface upon which a first pattern of depressions is formed and which is immersed in hot melt adhesive 52 stored in adhesive tank 51; a step in which second roll 55, which has a surface upon which a second pattern or projections is formed, is brought into contact with the aforesaid first roll 53, and first roll 53 and second roll 55 are caused to rotate and adhesive is transferred from the first roll's depressions to the second roll's aforesaid projections; and a step in which the item being coated 56 is compressed at the aforesaid second roll 55 while being moved and the adhesive is transferred from the projections of the second roll 55 to the surface of the aforesaid item being coated 56. In addition, FIG. 2 shows a pressure roll 57, a nip roll 58, and a material 59 being glued on. This coating method is superior in that a fine dense pattern can be coated by combining the depression pattern of first roll 53 with the raised pattern of second roll 55.

However, the previously described coating method has the following problems. Namely, the amount of adhesive coated on the item being coated is determined by the depth of the depressions formed on the surface of the first roll, so it is difficult to regulate increases or decreases in the amount of adhesive coated, and if one wishes to change the amount of adhesive coated it is necessary to replace the roll with one in which the depth of the depressions has been changed.

Also, the hot melt adhesive in the adhesive tank in which the first roll is immersed is retained while being heated for long periods, so it is likely to degrade, and depending on the type of adhesive, changes in viscosity may occur, making stable coating impossible.

Ideally, all of the adhesive loaded into the depressions in the first roll would be transferred to the second roll, but there is not always a 100% transfer. In such cases the small amount of adhesive remaining in the first roll depressions carbonizes due to continuous operation over long periods and reduces the depth of the depressions, and in the worst-case scenario completely plugs the depressions. In such cases the first roll must be removed from the apparatus and cleaned, necessitating much time for disassembling and rebuilding the apparatus.

Also, the first roll is equipped with a doctor blade, but adjusting this requires considerable expertise, and if the doctor blade does not contact the roll with equal insertion pressure along the entire width of the roll, there will be irregularities in the adhesive coating and quality will suffer. Also, since the doctor blade is constantly in contact with the first roll, and if insertion pressure weakens due to wear, adhesive will not be confined to depressions but will also adhere to the roll surface outside depressions, so this adhesive too will be transferred to the item being coated, causing contamination and decreases in quality, and resulting in destruction of the fine dense coating pattern.

SUMMARY OF THE INVENTION

The present invention is one which was created in consideration of these problems. Its object is to provide a roll transfer coating method for adhesive which applies to roll transfer coating of hot melt adhesive, and which minimizes to the greatest extent possible the retained portion of hot melt adhesive, thereby preventing degradation of the hot melt adhesive, and which makes it possible to do stable coating of the set coating amount over a long period of time after it has been set once, and which makes it possible to easily change the coating amount when changing the coating amount, and which moreover is relatively easy to maintain. An additional object is to provide a roll transfer coating method for a hot melt adhesive in which adhesive is reliably transferred from a coating roll to the item being coated.

The present invention provides the following method in order to resolve the above-noted problems. Namely, it is a roll transfer coating method for adhesive, comprising:

a step in which hot melt adhesive supplied from a hot melt adhesive supply apparatus passes through a slotted nozzle with a smoother roll and coats the raised pattern surface of a coating roll upon which a raised pattern is formed, a step in which the item being coating is sandwiched and compressed while being moved between said coating roll and a compression roll and the hot melt adhesive coated on the projections of the coating roll is transferred from the raised surface of the coating roll to the surface of said item being coated, and a step in which hot air for accelerating hot melt adhesive transfer is blown from a direction opposite the roll rotation direction and toward the hot melt adhesive transfer region sandwiched between said coating roll and compression roll.

The roll transfer coating method for adhesive described above also provides a roll transfer coating method for adhesive which has a step in which a liquid mold releasing agent is coated on the raised pattern surface of a coating roll upon which a raised pattern is formed before the step in which a hot melt adhesive supplied from a hot melt adhesive supply apparatus passes through a slotted nozzle with a smoother roll and coats the raised pattern surface of a coating roll upon which a raised pattern is formed.

DETAILED DESCRIPTION OF THE PREFERRED EMBODIMENT

In a preferred embodiment of the present invention, first, hot melt adhesive melted by a hot melt adhesive supply apparatus is supplied to a slotted nozzle, and then the hot melt adhesive is coated on the coating roll's raised pattern surface from a smoother roll installed so that it can rotate freely at the tip of the slotted nozzle. When doing so, the coating amount of hot melt adhesive coated on the coating roll from the slotted nozzle can be easily changed by changing the supply pressure of the hot melt adhesive.

When the coating roll rotates and the adhesive coated on its raised surface reaches a position facing the compression roll, the adhesive is transferred to the surface of the item being coated, which is continuously supplied so that it is sandwiched between the coating roll and the compression roll. The compression roll has the responsibility of pressing the item being coated into the coating roll so that adhesive is completely transferred from the coating roll to the surface of the item being coated. However, there are many varieties of hot melt adhesive, and some are difficult to release and transfer poorly because of their intrinsic viscosity, of course. Consequently, the transfer from the coating roll to the item being coated can be made reliable by blowing hot air from a direction opposite the roll rotation direction and toward the hot melt adhesive transfer region sandwiched between the coating roll and compression roll.

In cases in which not even blowing hot air affords complete transfer, a solution is to provide an auxiliary process in which a liquid mold releasing agent is coated on the raised pattern surface before the process in which the hot melt adhesive coats the raised pattern surface of a coating roll.

In the next step the item being coated, now coated with adhesive, is matched with the material being glued, and advances to the next step. In this method the melted hot melt adhesive is directly coated from the slotted nozzle onto the coating roll, so there is no long-term retention of hot melt adhesive, compared to a conventional structure in which the first roll is immersed in a tank of adhesive, and adhesive degradation or quality changes do not occur. Adhesive is reliably transferred to the item being coated by means of hot air blowing or an auxiliary coating of mold releasing agent, so it does not remain on the roll surface and carbonize. This method also eliminates the need for expertise in adjusting a worn roll doctor, as found in prior art, and makes maintenance easy.

Figure 1:
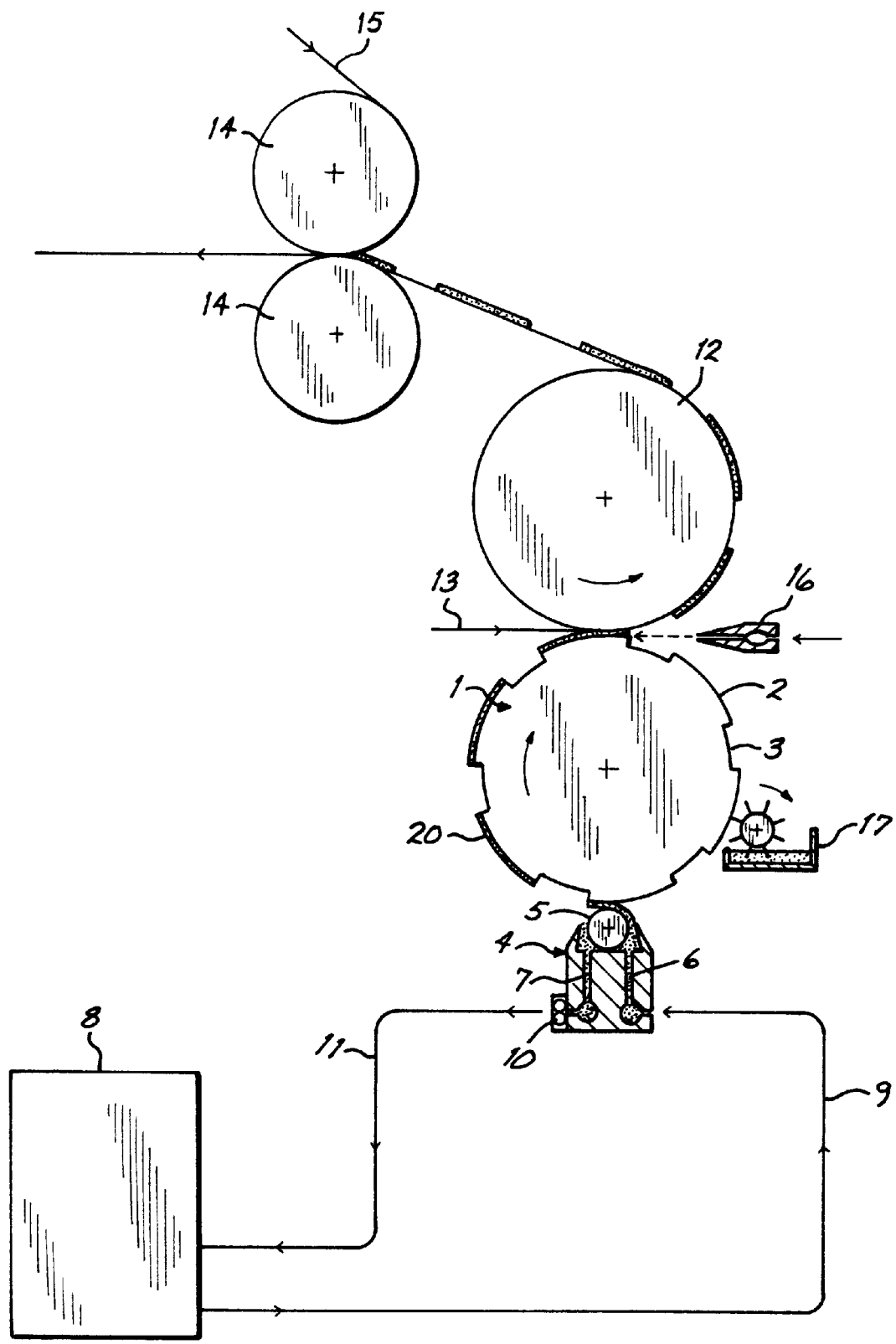
FIG. 1 is a drawing explaining the inventive adhesive roll transfer coating method.
Figure 2:
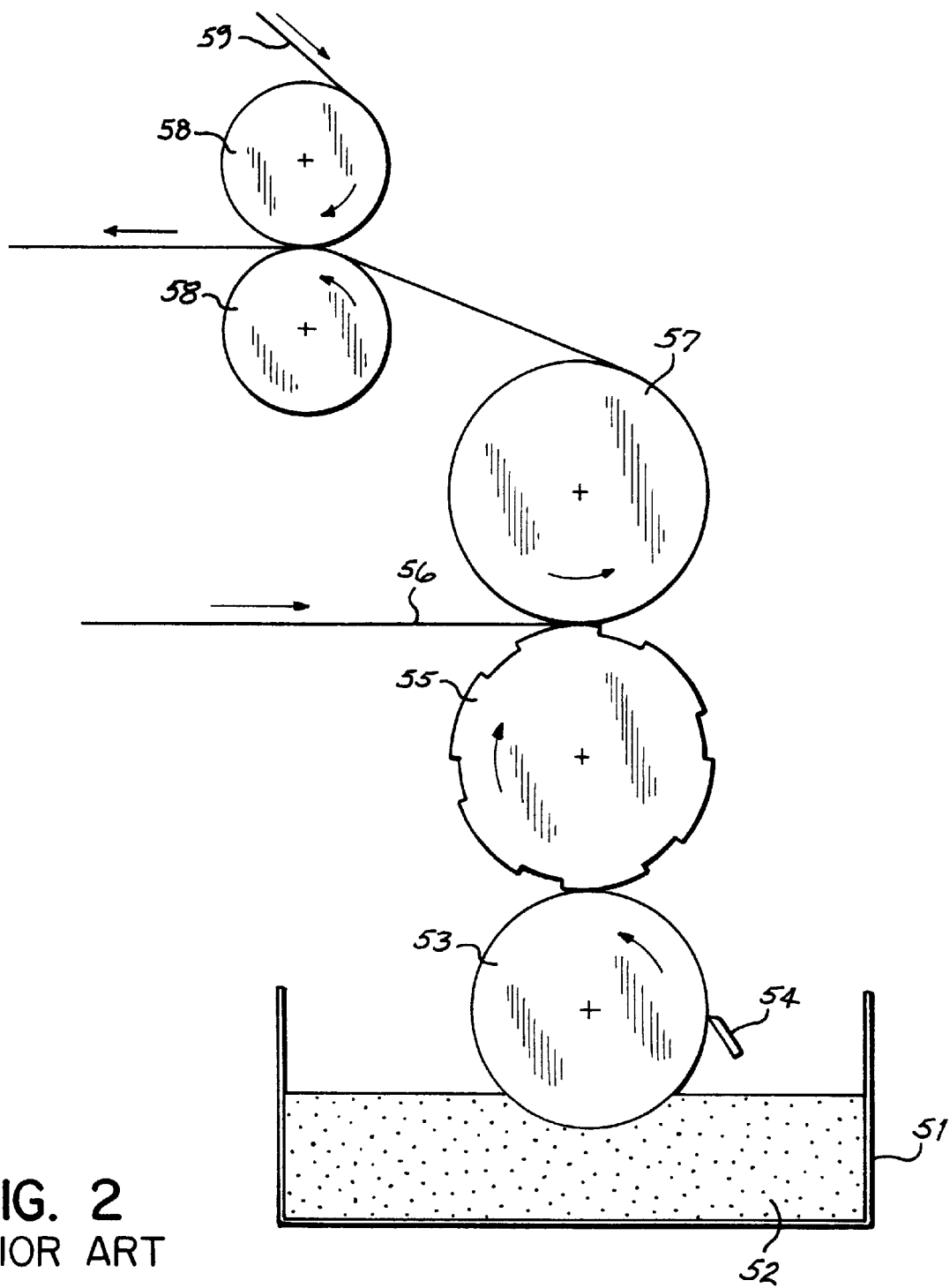
FIG. 2 is a drawing explaining a conventional adhesive roll transfer coating method.

FIG. 1 is an explanatory drawing showing the main structural units of an apparatus implementing one example of the present invention. As shown in FIG. 1, a coating roll 1 has projections 2 and depressions 3 formed on its outer periphery in a prescribed pattern, and it rotates. A slotted nozzle 4 is provided for coating hot melt adhesive 20 on projections 2 on the surface of roll 1. A smoother roll 5 is installed at the tip of slotted nozzle 4 so that it can freely rotate. A slot-shaped adhesive supply passage 6 and adhesive return passage 7 are also provided for reasons explained below.

A hot melt adhesive supply apparatus 8 consists of a melting tank to heat and melt hot melt adhesive 20, a pump mechanism to pressurize and send the melted hot melt adhesive, and a control mechanism to electrically control the hot melt adhesive's temperature and pressure, etc. An outlet of hot melt adhesive supply apparatus 8 is connected to the adhesive supply passage 6 of the aforesaid slotted nozzle 4 via tube 9, which is a hose, etc.

Also, gear pump 10, for forcibly expelling hot melt adhesive that was not coated on coating roll 1, is attached to adhesive return passage 7 of slotted nozzle 4. Gear pump 10 includes a discharge port connected to the return port of hot melt adhesive supply apparatus 8 via tube 11, which is a hose, etc.

A compression roll 12 presses strip-shaped item being coated 13 into coating roll 1, so its rotation is synchronized with that of coating roll 1. A pair of nip rolls 14 glue together item being coated 13, which has been coated with hot melt adhesive 20, and the material being glued 15.

A hot air nozzle 16 receives a supply of hot air from a hot air supply apparatus not shown in the drawing, and blows hot air from a direction opposite the roll rotation direction and toward the hot melt adhesive transfer region sandwiched between coating roll 1 and compression roll 12. A liquid mold releasing agent coating apparatus 17 coats liquid mold releasing agent onto the surface of projections 2 with a rotating brush.

To explain the operation of an apparatus thus constituted, when hot melt adhesive melted in hot melt adhesive supply apparatus 8 is supplied to slotted nozzle 4 via tube 9, hot melt adhesive 20 coats the surface of projection 2 on coating roll 1, which is rotating almost in contact with smoother roll 5 installed at the tip of slotted nozzle 4. When depression 3 of coating roll 1 reaches the tip of slotted nozzle 4 (i.e., smoother roll 5) hot melt adhesive 20 is forced to recirculate from adhesive return passage 7 to hot melt adhesive supply apparatus 8 by means of gear pump 10.

Hot melt adhesive 20, which is coated on projection 2 on coating roll 1, follows the rotation of coating roll 1 and is transferred and coated on item being coated 13, which is supplied between coating roll 1 and compression roll 12. To ensure reliable transfer at this time, hot air is blown from hot air nozzle 16 from a direction opposite the roll rotation direction and toward the hot melt adhesive transfer region sandwiched between the aforesaid coating roll 1 and compression roll 12. Because of this hot air blowing, transfer of hot melt adhesive is made reliable and hot melt adhesive does not remain on coating roll 1. Item being coated 13, coated with hot melt adhesive 20, is glued to the material being glued 15 at a pair of nip rolls 14, and advances to the next process, which is now shown in the drawing.

The varieties of hot melt adhesive include some whose transferability is poor, i.e., whose releasing characteristics are poor. When using an adhesive with this sort of bad release properties, the surface of projection 2 on coating roll 1 should be coated with a liquid mold releasing agent by liquid mold releasing agent coating apparatus 17 before the process in which hot melt adhesive is coated on the raised surface pattern 2 on coating roll 1. It is also effective to coat the surface of projection 2 on coating roll 1 with a material with good release, such as silicone rubber or fluororesin, etc.

Compared to conventional coating methods, in the adhesive transfer coating method in the example described above, hot melt adhesive is not retained for a long time after exposure to air in a heated and melted state, so degradation does not occur and viscosity changes do not occur, and it can be coated in a stable manner. Also, when changing the amount of adhesive coated, this can be easily achieved by changing the supply pressure of hot melt adhesive supplied to slotted nozzle 4. It is extremely easy to change the pressure by means of the pressure control mechanism incorporated into the hot melt adhesive supply apparatus 8.

Also, transfer of hot melt adhesive from coating roll 1 to item being coated 13 is made reliable by blowing hot air from hot air nozzle 16, and no residue remains on coating roll 1. Moreover, adhesive is coated on coating roll 1 by slotted nozzle 4, eliminating the complicated prior art mechanisms such as a doctor blade mechanism or a bearing mechanism, so maintenance and adjustment are easy. Moreover, slotted nozzle 4 is a mechanism with smoother roll 5, so adhesive coating can be performed in an attractive manner with no flow marks, etc.

Compared to conventional coating methods as described above, the present invention as described above provides a roll transfer coating method for hot melt adhesive which applies to roll transfer coating of hot melt adhesive, and minimizes to the greatest extent possible the retained portion of hot melt adhesive, thereby preventing degradation of the hot melt adhesive, and making it possible to do stable coating the set coating amount over a long period of time after it has been set once, and making it possible to easily change the coating amount of simply changing the adhesive supply pressure when changing the coating amount, and which moreover is relatively easy to maintain. It also reliably transfers and coats adhesive from the coating roll to the item being coated by blowing hot air at the adhesive transfer region.

While the present invention has been illustrated by a detailed description of preferred embodiments, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and methods as shown and described. The invention itself should only be defined by the appended claims, wherein

I claim:

1. A roll transfer coating method for applying adhesive to an item, the method comprising:

supplying adhesive through a slotted nozzle to coat a rotating first roll with the adhesive, said first roll having a raised pattern surface, moving an item to be coated between the first roll and a rotating second roll such that the adhesive coating on the raised pattern surface of the first roll is transferred to the item at an adhesive transfer region defined between the first and second rolls, and blowing heated air from a direction opposite to the respective directions of rotation of the first and second rolls at the adhesive transfer region.

2. The method of claim 1, wherein the adhesive further comprises a hot melt adhesive.

3. The method of claim 1 further comprising the step of adhering a material to the adhesive coating.

4. The method of claim 3, wherein the material is a sheet material, and the method further comprises the step of continuously feeding the item and the sheet material between the pair of rolls after the blowing step.

5. The method of claim 4, wherein the item is another sheet material.

6. A roll transfer coating method for applying adhesive, the method comprising:

coating a raised pattern surface of a coating roll with a mold releasing agent, supplying adhesive through a slotted nozzle onto a smoother roll, transferring the adhesive from the smoother roll to the raised pattern surface of the coating roll, moving an item to be coated between the coating roll and a compression roll to transfer the adhesive on the raised pattern surface of the coating roll to a surface of the item at an adhesive transfer region disposed between the coating and compression rolls, and blowing heated air toward the adhesive transfer region from a direction opposite to the respective directions of rotation of the coating and compression rolls.

7. The method of claim 6, wherein the adhesive further comprises a hot melt adhesive.

8. The method of claim 6 further comprising the step of adhering a material to the adhesive coating.

9. The method of claim 8, wherein the material is a sheet material, and the method further comprises the step of continuously feeding the item and the sheet material between the pair of rolls after the blowing step.

10. The method of claim 9, wherein the item is another sheet material.

11. The method of claim 6 further comprising the step of adjusting the amount of adhesive being coated on the smoother roll by changing an adhesive supply pressure associated with the slotted nozzle.

12. A roll transfer coating method for applying adhesive to an item, the method comprising:

supplying adhesive through a slotted nozzle to coat a rotating first roll with the adhesive, said first roll having a raised pattern surface, moving an item to be coated between the first roll and a rotating second roll such that the adhesive coating on the raised pattern surface of the first roll is transferred to the item at an adhesive transfer region defined between the first and second rolls, blowing air from a direction opposite to the respective directions of rotation of the first and second rolls at the adhesive transfer region, and adjusting the amount of adhesive being coated on the first roll by changing an adhesive supply pressure associated with the slotted nozzle.

13. The method of claim 12, wherein the adhesive further comprises a hot melt adhesive.

14. The method of claim 12 further comprising the step of adhering a material to the adhesive coating.

15. The method of claim 14, wherein the material is a sheet material, and the method further comprises the step of continuously feeding the item and the sheet material between the pair of rolls after the blowing step.

16. The method of claim 15, wherein the item is another sheet material.

17. The method of claim 12, wherein the blowing step further comprises blowing heated air.

* * * * *